(No Model.)
J. FARRELL.
WHIP.
No. 435,889. Patented Sept. 2, 1890.
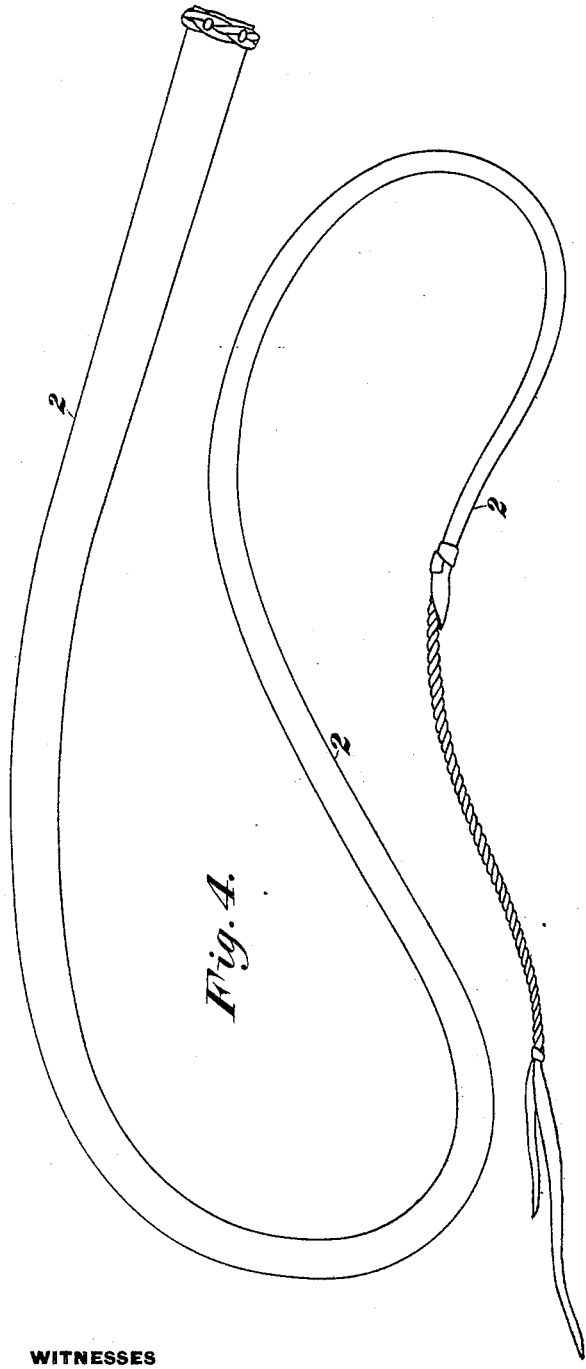
WITNESSES
H. L. Gill.
W. B. Corwin
INVENTOR
John Farrell
by W. Bakewell Sons
his Attys.

UNITED STATES PATENT OFFICE.

JOHN FARRELL, OF PITTSBURG, PENNSYLVANIA.

WHIP.

SPECIFICATION forming part of Letters Patent No. 435,889, dated September 2, 1890.

Application filed June 12, 1890. Serial No. 355,129. (No model.)

*To all whom it may concern:*

Be it known that I, JOHN FARRELL, of Pittsburg, in the county of Allegheny and State of Pennsylvania, have invented a new and useful Improvement in Whips, of which the following is a full, clear, and exact description, reference being had to the accompanying drawings, forming part of this specification, in which—

Figure 1 is a longitudinal section showing the pellet-filled portion of a whip constructed in accordance with my invention. Fig. 2 is a detail view showing one of the pellets of the whip. Fig. 3 is a longitudinal section showing pellets of modified construction. Fig. 4 is a view of the entire whip. Fig. 5 is a longitudinal sectional view showing the pellets at the end portion of the whip-sheath.

Like symbols of reference indicate like parts in each.

My invention relates to an improvement in that class of whips made by incasing metal pellets in a sheath or tube or leather and commonly used as cattle-whips; and it consists in a whip the adjacent pellets of which are mutually fitted together in the manner of ball-and-socket joints, the adjacent sides of the pellets being respectively concave and convex. The advantage resulting from this construction is that the whip is very flexible and compact, and when bent the pellets occupy constantly the same relation in position to each other, so that the incasing-sheath is properly supported and is not strained unduly, as is the case where the whip is provided with rectangular pellets, the sides of which diverge and stretch the sheath when the whip is bent.

Referring now to Fig. 1 of the drawings, 2 represents the whip-sheath, which consists of a leather tube preferably tapering in form from the butt toward the tip.

3 3 are the pellets (preferably made of lead) with which the sheath is filled. These pellets are of substantially globular form, each having a lateral spherical cavity or depression *b*. In placing the pellets in the whip the globular side of each is adjacent to and fits into the cavity of the next, as shown in the drawings, so that in bending the whip the pellets turn within each other, forming a continuous series of universal joints. Toward the tip of the whip the pellets may be made successively smaller, as shown in Fig. 1, and at the small end of the leather sheath the small shot may be entirely globular and need not be fitted together. This is shown in Fig. 5.

In Fig. 3 I show a modified construction, in which, instead of making each of the pellets of the same shape, I use alternately-arranged globular pellets and pellets with cavities on both sides, into which the globular pellets fit. Other modifications will suggest themselves to the skilled mechanic.

I claim—

A whip having pellets contained therein, whose adjacent sides are convex and concave, substantially as and for the purposes described.

In testimony whereof I have hereunto set my hand this 31st day of May, A. D. 1890.

JOHN FARRELL.

Witnesses:
W. B. CORWIN,
H. M. CORWIN.